United States Patent
Ozolins

[19]

[11] Patent Number: 5,990,858
[45] Date of Patent: Nov. 23, 1999

[54] FLAT PANEL DISPLAY TERMINAL FOR RECEIVING MULTI-FREQUENCY AND MULTI-PROTOCOL VIDEO SIGNALS

[75] Inventor: Helmars Ozolins, Rocky Point, N.Y.

[73] Assignee: Bloomberg L.P., New York, N.Y.

[21] Appl. No.: 08/707,433

[22] Filed: Sep. 4, 1996

[51] Int. Cl.[6] .................................................. G06F 17/30
[52] U.S. Cl. ........................... 345/99; 345/99; 345/154; 345/211; 345/132; 348/558; 348/443
[58] Field of Search .............................. 345/99, 204, 98, 345/211–213, 22, 214, 132, 154; 348/558, 554, 555, 556, 443

[56] References Cited

U.S. PATENT DOCUMENTS

| | | | |
|---|---|---|---|
| 4,275,421 | 6/1981 | Louie et al. | 358/183 |
| 4,581,654 | 4/1986 | Kobayashi et al. | 358/230 |
| 4,740,786 | 4/1988 | Smith | 340/784 |
| 4,860,246 | 8/1989 | Inoue | 364/900 |
| 4,922,237 | 5/1990 | Inoue | 340/723 |
| 4,990,904 | 2/1991 | Zenda | 340/771 |
| 4,998,099 | 3/1991 | Ishii | 340/784 |
| 4,998,100 | 3/1991 | Ishii | 340/784 |
| 5,111,190 | 5/1992 | Zenda | 340/717 |
| 5,150,109 | 9/1992 | Berry | 340/811 |
| 5,153,575 | 10/1992 | Watts, Jr. et al. | 340/790 |
| 5,168,270 | 12/1992 | Masumori et al. | 340/784 |
| 5,170,156 | 12/1992 | DeMonde et al. | 340/794 |
| 5,247,286 | 9/1993 | Ishikawai | 345/3 |
| 5,257,015 | 10/1993 | Inoue | 345/26 |
| 5,272,471 | 12/1993 | Asada et al. | 345/149 |
| 5,285,192 | 2/1994 | Johary et al. | 345/3 |
| 5,293,485 | 3/1994 | Zenda | 395/164 |
| 5,309,168 | 5/1994 | Itoh et al. | 345/3 |
| 5,313,225 | 5/1994 | Miyadera | 345/102 |
| 5,327,156 | 7/1994 | Masukane et al. | 345/113 |
| 5,334,992 | 8/1994 | Rochat et al. | 345/22 |
| 5,442,371 | 8/1995 | Miller et al. | 345/150 |
| 5,442,372 | 8/1995 | Shiki | 345/98 |
| 5,475,808 | 12/1995 | Kobayashi | 395/150 |
| 5,479,184 | 12/1995 | Tokumitsu | 345/3 |
| 5,606,348 | 2/1997 | Chiu | 345/213 |
| 5,790,096 | 8/1998 | Hill, Jr. | 345/150 |

*Primary Examiner*—Thomas G. Black
*Assistant Examiner*—William Trinh
*Attorney, Agent, or Firm*—Fish & Neave; Thomas L. Giannetti; Walter M. Egbett, III

[57] ABSTRACT

An apparatus and method for enabling a flat panel display terminal to simulate operations of a multifrequency cathode-ray tube monitor. The synchronization signals included in the input analog video signals are analyzed to identify a display protocol. The predetermined parameters for the identified display protocol are used to program the analog liquid crystal display panel and phase-locked loop of the flat panel display terminal.

24 Claims, 8 Drawing Sheets

FLAT PANEL DISPLAY TERMINAL FOR RECEIVING MULTI-FREQUENCY AND MULTI-PROTOCOL VIDEO SIGNALS

BACKGROUND OF THE INVENTION

This invention relates to flat panel display terminals. Examples of flat panel display terminals are electroluminescence, liquid crystal displays ("LCDs") and plasma or gas-discharge displays. More particularly, the invention relates to interfaces of LCDs for simulating the operations of multifrequency cathode-ray tube ("CRT") monitors.

Flat panel technology has been encouraging as of the late 1980s, particularly for buyers not concerned with cost. Many advantages of the flat panel display terminals are known over the CRT type monitors which have enjoyed almost universal application in personal computers. For example, an LCD monitor provides advantages including a flat surface, inherent sharpness, low power consumption, less eye-strain on the user and compact size. The flat surface of an LCD also eliminates problems associated with the convex surface of a CRT screen such as undesirable curved lines and distorted images near the edges of the CRT screen. With their compact size, low-power usage and light weight, LCDs have been used typically in laptop computers and seatback televisions on aircraft.

With the introduction of high-quality and low-price LCD models, the computer industry has taken a closer look at flat panel display terminals for use in desktop computers and workstations. Since most computers produce video signals appropriate for the CRT monitors, attempts have been made to develop controllers or converters to resolve the differences between the CRT monitors and the LCDs. For example, the LCDs are chemically operative systems whereas the CRT monitors are electrically operative systems. The converters, thus, need to address a slower response time of the LCDs. Also, while the CRT monitors can display any number of horizontal and vertical lines, the LCDs have a set number of horizontal and vertical lines. The converters need to deal with such limitations as well.

Additional concern for LCD use in a desktop computer is the physical distance between the LCD panel and the graphic board. Direct connections between the graphic controllers and the LCDs are possible in laptop computers where LCDs are closely positioned to graphic controllers within the same computer chassis. LCDs having parallel RGB interfaces, therefore, can directly receive the RGB signals provided by the graphic controllers.

However, for desktop computers, the graphic controllers are generally located inside the computer chassis while the RGB interfaces are located in separate monitors. The RGB signal outputs from the graphic controllers, therefore, are provided indirectly via video cables connecting the graphic boards of the desktop computers and the LCDs. Since standard desktop computers produce analog RGB signals for cable connections instead of digital video signals, digital LCDs need additional analog to digital converters ("ADCs") to interpret the video signals from the desktop computers. Such conversions negatively effect the resulting screens due to the difficult timing and complications associated with the conversions.

In response to such complications, analog LCDs that are capable of utilizing analog RGB signals have been introduced to the market recently. Although such analog LCDs do not require ADCs, the currently available interfaces either require stacks of boards or are incapable of any high-level functions. For example, even though analog LCDs allow multiple resolutions such as VGA, SVGA, XGA, TEXT 1 and TEXT 2, the currently available interfaces for the analog LCDs cannot compensate for inaccuracies or offsets that accompany the video signals primarily directed for the CRT monitor use.

It is therefore an object of this invention to provide simplified, sophisticated, effective and inexpensive apparatus for flat panel display terminals. More particularly, it is an object of this invention to provide an interface that allows analog LCDs to simulate the operations of multifrequency CRT monitors having capabilities to adjust to various display protocols.

SUMMARY OF THE INVENTION

These and other objects of the invention are accomplished in accordance with the principles of the invention by providing an apparatus and method that enable a flat panel display terminal to simulate the operations of a multifrequency cathode-tube monitor. The apparatus receives analog video signals and extracts synchronization signals from the received analog video signals. The apparatus also includes a microprocessor for measuring the frequency of the synchronization signals and determining a display protocol based on such frequency. Thereafter, the microprocessor retrieves the predetermined parameters for the display protocol and programs an analog liquid crystal display panel and a phase-locked loop with the retrieved parameters.

In another aspect of the invention, the microprocessor detects any adjustment made by a user of the flat panel display terminal. For example, the user can adjust the horizontal and vertical positions, horizontal width or brightness of the analog liquid crystal display panel. The adjusted parameters supersede the standard parameters of the display protocol. A push-button interface is provided for user inputs.

Further features of the invention, its nature and various advantages will be more apparent from the accompanying drawings and the following detailed description of the preferred embodiments.

DETAILED DESCRIPTION OF THE PREFERRED EMBODIMENTS

Figure 1:
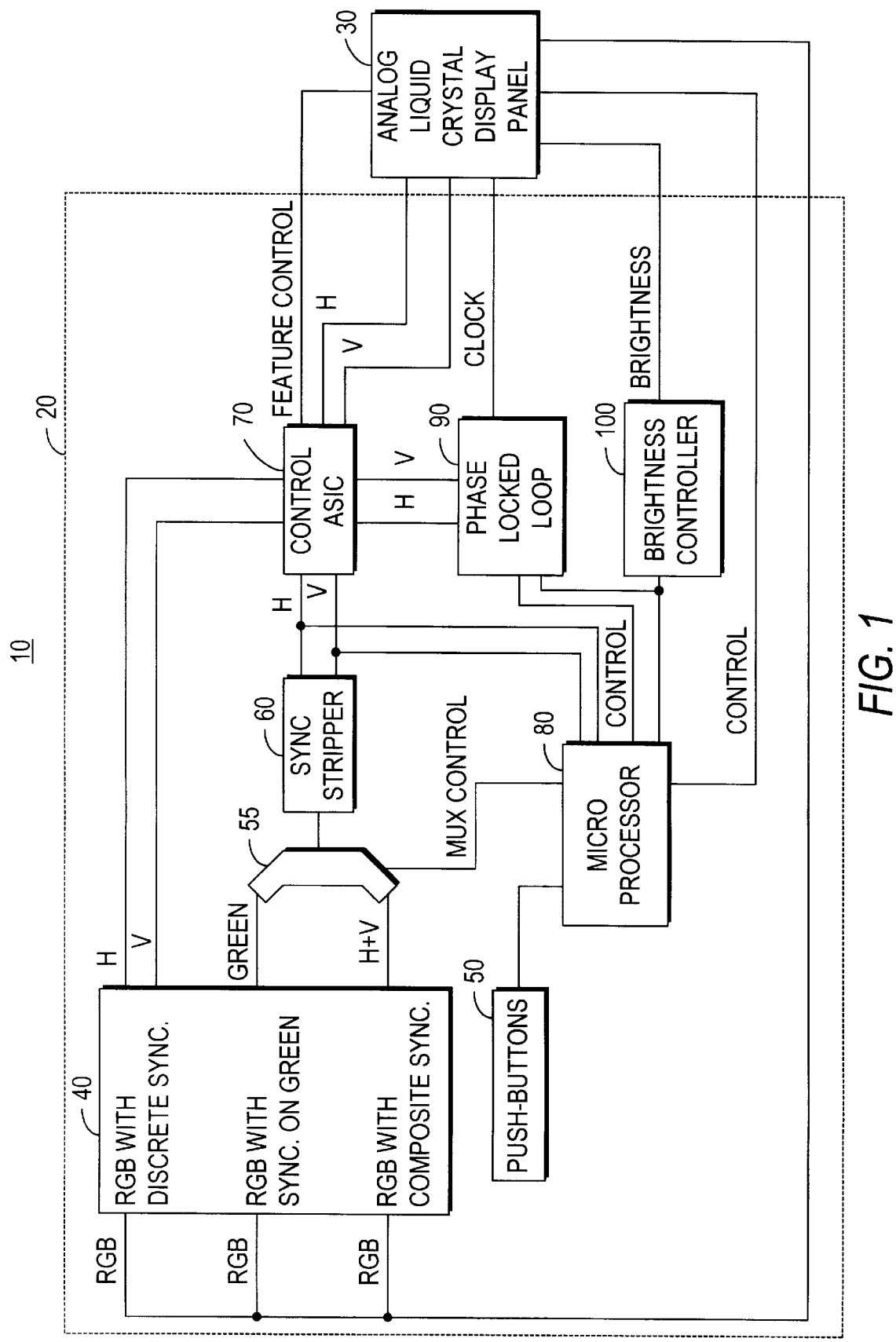
FIG. 1 is a simplified block diagram of illustrative apparatus which can be operated in accordance with this invention.
Figure 2:
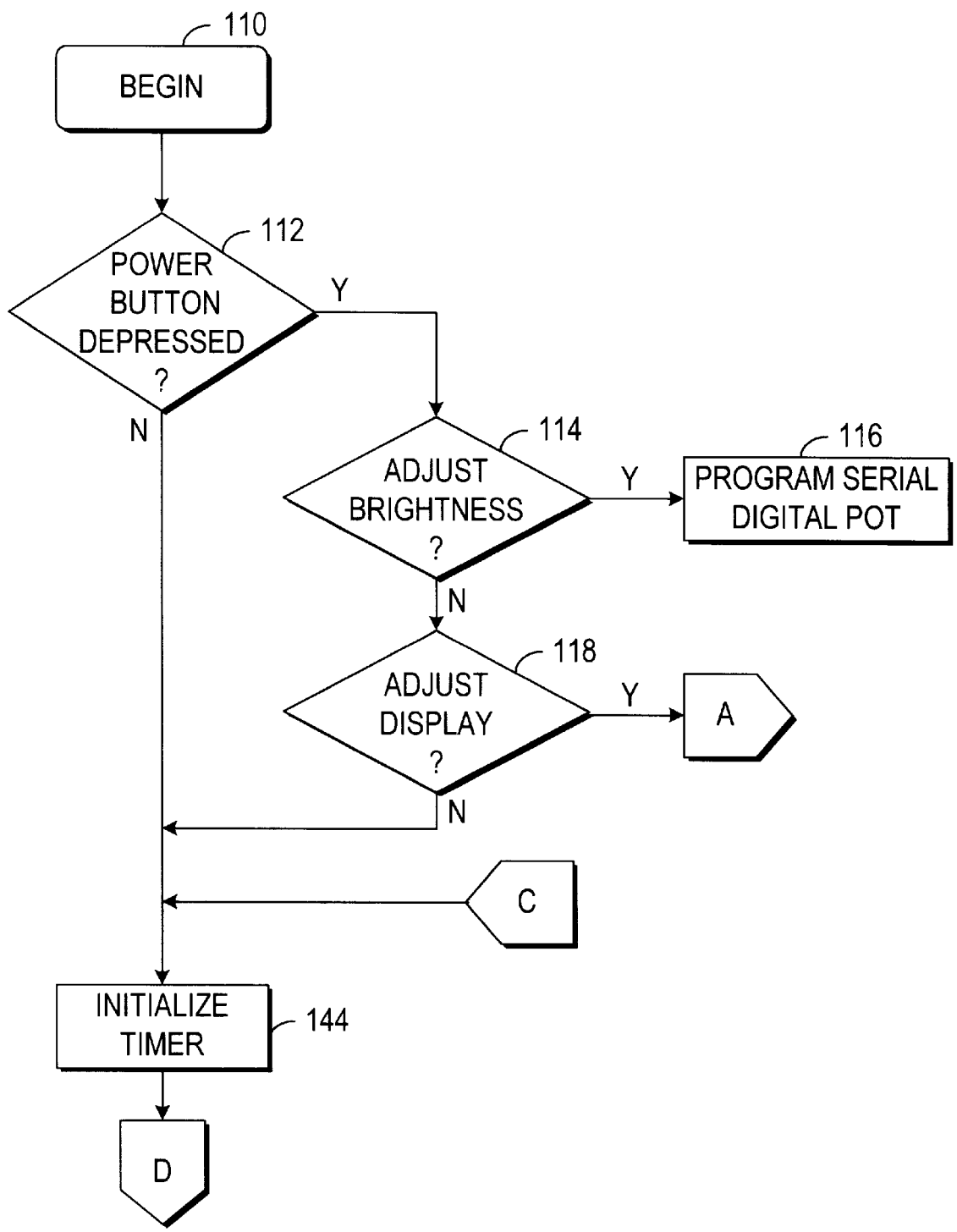
FIGS. 2–8 are flow charts of steps for carrying out an illustrative embodiment of the methods of this invention.

In the illustrative embodiment shown in FIG. 1, a representative interface circuit that allows an analog LCD panel to operate similarly to a multifrequency CRT display is shown. It will be understood that the present invention is equally applicable to many other types and constructions of flat panel display terminals and that a circuit for flat panel display terminal 10 is described herein only as an example in which the invention can be used.

As shown in FIG. 1, flat panel display terminal 10 may be divided into the two components of interface 20 and analog LCD panel 30. Interface 20 receives input signals originating from the graphic controller of the desktop computer via a video cable and forwards processed output signals to analog LCD panel 30. An example of video cable is a typical VGA cable that is slightly modified with an additional pin-out for a power supply. This consolidation of functions in one cable eliminates the need for a separate power supply cable and allows flat panel display terminal 10 to run off the simplified connection between flat panel display terminal 10 and a desktop computer.

In the depicted preferred embodiment, interface 20 includes cable adaptor 40, push-buttons 50, multiplexor 55, sync-stripper 60, control application specific integrated circuit ("ASIC") 70, microprocessor 80, phase-locked loop ("PLL") 90 and brightness control 100.

Video cable adaptor 40 receives various types of video signals from the computer's graphic board. Video cable adaptor 40 passes the RGB signal portion of the video signals to analog LCD panel 30. For the synchronization signals, video cable adaptor 40 first determines the type of synchronization encoding. For example, the video signals may be any of the following types: RGB signals with discrete synchronization, RGB signals with synchronization on green or RGB signals with composite synchronization. The RGB signals with discrete synchronization do not require decoding. The horizontal and vertical synchronization signals are separate signals that can be used directly by control ASIC 70 and microprocessor 80. The RGB signals with synchronization on green, on the other hand, require decoding. The horizontal and vertical synchronization signals are superimposed on a green signal and need to be extracted from the green signal. Similarly, the RGB signals with composite synchronization require decoding. The horizontal and vertical synchronization signals are combined into one composite signal and each synchronization signal needs to be extracted from the composite signal. Based on the identified type of the video signals, video cable adaptor 40 sends the synchronization signal portion of the video signals to either control ASIC 70 or sync-stripper 60.

For the RGB signals with synchronization on green and the RGB signals with composite synchronization, multiplexer 55 is grounded to point to one of these signals and pass the signals to sync-stripper 60. Thereafter, sync-stripper 60 is invoked to extract the horizontal and vertical synchronization signals from either the green or composite signals. An example of sync-stripper 60 is EL4583 manufactured by Elantec. The horizontal and vertical synchronization signals, whether those are directly provided from video cable adaptor 40 or converted at sync-stripper 60, are the inputs driving control ASIC 70, micro-processor 80, PLL 90, analog LCD 30 and brightness controller 100.

Control ASIC 70 is a reprogrammable ASIC with a serial programmable port. Control ASIC 70 is a relatively small scale chip necessary to support microprocessor 80 and sometimes referred to as glue logic. Control ASIC 70 may be used as random, lowly gate, flip-flop, buffer or latch. An example of control ASIC 70 is LSI1016 produced by Lattice Semiconductor.

Push-buttons 50 include several buttons each relating to a different function. For example, one button may be designed for power on/off. Another button may be used for increasing brightness while the other button may be used for decreasing brightness. Push-buttons 50 may also be used for various other purposes such as centering or adjustment of the screens on LCD panel 30 by depressing particular combinations or sequences of buttons. For example, a user may choose to adjust horizontal position, vertical position or horizontal width of the screen. Upon depressing a particular combination of buttons for the desired adjustment mode, the user may further use push-buttons 50 to control and fine-tune the screen on analog LCD panel 30 just as in CRT monitors. The adjustment of the screens on analog LCD panel 30 is described in greater detail below.

Microprocessor 80 includes a read-only memory ("ROM") for storing default, nominal or standard parameters for various display protocols. Microprocessor 80 also includes an electrically erasable and programmable read-only memory ("EEPROM") so as to allow rewriting of the default parameters. These parameters include, for example, set values for horizontal and vertical positions, horizontal width and brightness. When flat panel display terminal 10 is turned on, the parameters from ROM are usually used to reset PLL 90 and analog LCD panel 30 with the nominal values premeasured for a particular VGA card.

Microprocessor 80 is designed to constantly sample the incoming horizontal and vertical synchronization signals in order to detect a display protocol change. The sampling is done by counting the number of horizontal lines between the vertical blanks. The counted number of horizontal lines identifies the display protocol of the incoming video signals.

For example, it is very common for a personal computer to start with a DOS mode having a 640×400 dimension when it is powered on. When the Windows operating program is invoked, the video signals formatted in the Windows mode have a different number of horizontal lines representing a new dimension. In such case, microprocessor 80 looks up a table that has sets of default or standard parameters corresponding to the display protocol of the Windows mode. The table contains the values for analog LCD panel 30 as well as the values for PLL 90. Each value for the analog LCD panel 30 may take five bytes, while each value for the PLL 90 may take fourteen bytes. Subsequently, microprocessor 80 sends out a five byte word to analog LCD panel 30 and a fourteen byte word to PLL 90 as results of the table look-up.

Microprocessor 80 also detects the status of push-buttons 50 for the centering and adjusting of a screen. The sequence and combination of push-buttons 50 that are selected by the user determines the extent of changes on the screen. Microprocessor 80 may be connected to a beeper (not shown) so as to indicate the status of various modes. For example, horizontal centering mode, vertical centering mode or horizontal width adjustment mode may be indicated by the number of beeps.

Microprocessor 80 constantly samples incoming video signals. The power saving mode is invoked when the incoming video signals go beyond the display capability of analog LCD panel 30. For example, when the counted number of the horizontal lines in a frame does not fall into any of predetermined ranges of the display protocols, the backlight of analog LCD panel 30 is powered down. This power saving mode allows the flat panel display terminal 10 to operate within the Environmental Protection Agency's Energy power conservation program. Microprocessor 80 also assembles a forty-five bit word to reprogram analog LCD panel 30 every time the video mode changes or the user re-aligns the screen. The microprocessor 80 also assembles a sixty-six bit stream to reprogram PLL 90 to reflect changes. When microprocessor 80 does not detect any incoming video signal for a certain period of time, microprocessor 80 puts analog LCD panel 30 to a power-saving mode by turning down a backlight. One example of microprocessor 80 is PIC16C84 manufactured by Microchip.

PLL 90 receives the horizontal and vertical synchronization signals from control ASIC 70 as well as the control signals from microprocessor 80. PLL 90 essentially generates clock pulses based on an algorithm to determine the best resolution of analog LCD panel 30. PLL 90 uses the vertical synchronization signals to reset during its non-synchronization period and uses the horizontal synchronization signals to generate clock signals. An example of PLL 90 is ICS1522 made by ICS Corporation.

Brightness control 100 handles the brightness of the backlights in analog LCD panel 30. Brightness control 100 is basically a set of adjustable potentiometers that vary the voltage levels, e.g. ranging from zero to one volt, to control the brightness. Brightness control 100 can be preprogrammed with serial control words that may be eighteen bits long. When the serial control words are sent to Brightness Digital Potentiometer, the equivalent resistance linearly corresponding to the serial control words sets the brightness level of the screen backlights.

Analog LCD panel 30 receives the analog RGB signals directly from video cable adaptor 40. Analog LCD panel 30 also receives control signals, and horizontal and vertical synchronization signals from control ASIC 70. Analog LCD panel 30 further receives clock signals from PLL 90 and control signals from brightness control 100. Analog LCD panel 30 also receives control signals from microprocessor 80.

The interface of the present invention allows the display of any color depth from sixteen to sixteen million, at non-interlaced refresh rates up to 70 Hertz on analog LCD panel 30. An example of analog LCD panel 30 is the NL10276AC24-02 manufactured by NEC.

FIGS. 2–8 show an illustrative sequence of steps in accordance with this invention for operating the circuit of FIG. 1 as described above. To some extent these steps have already been mentioned, and the discussion of them here can be somewhat abbreviated.

In step 110, interface 20 is initialized by clearing out all of the RAM registers and sending some initial guess values to PLL 90 and to analog LCD panel 30 retrieved from the ROM of microprocessor 80. In step 112, microprocessor 80 determines whether push-buttons 50 indicate power on/power off. A user having access to push-buttons 50 is able to indicate if the brightness or centering of the screen requires adjustment by depressing push-buttons 50.

If the power on/power off button is depressed, microprocessor 80 in step 114 determines whether the brightness or intensity of the backlights of analog LCD panel 30 needs to be increased or decreased. If microprocessor 80 determines that the position of push-buttons 50 indicates the brightness level needs to be changed, the serial digital pot of brightness control 100 is reprogrammed to adjust the level of backlights in step 116.

Figure 3:
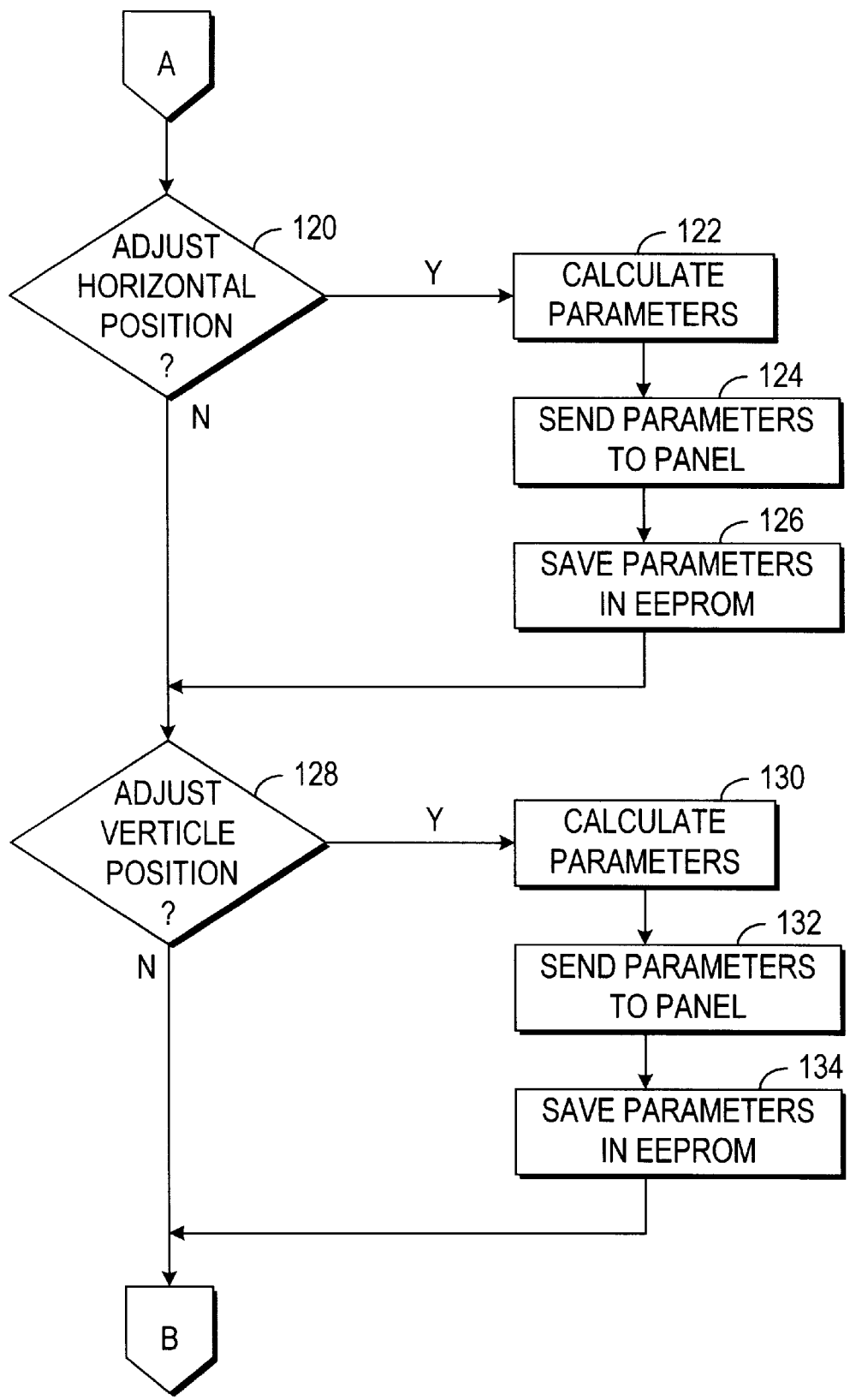
Figure 4:
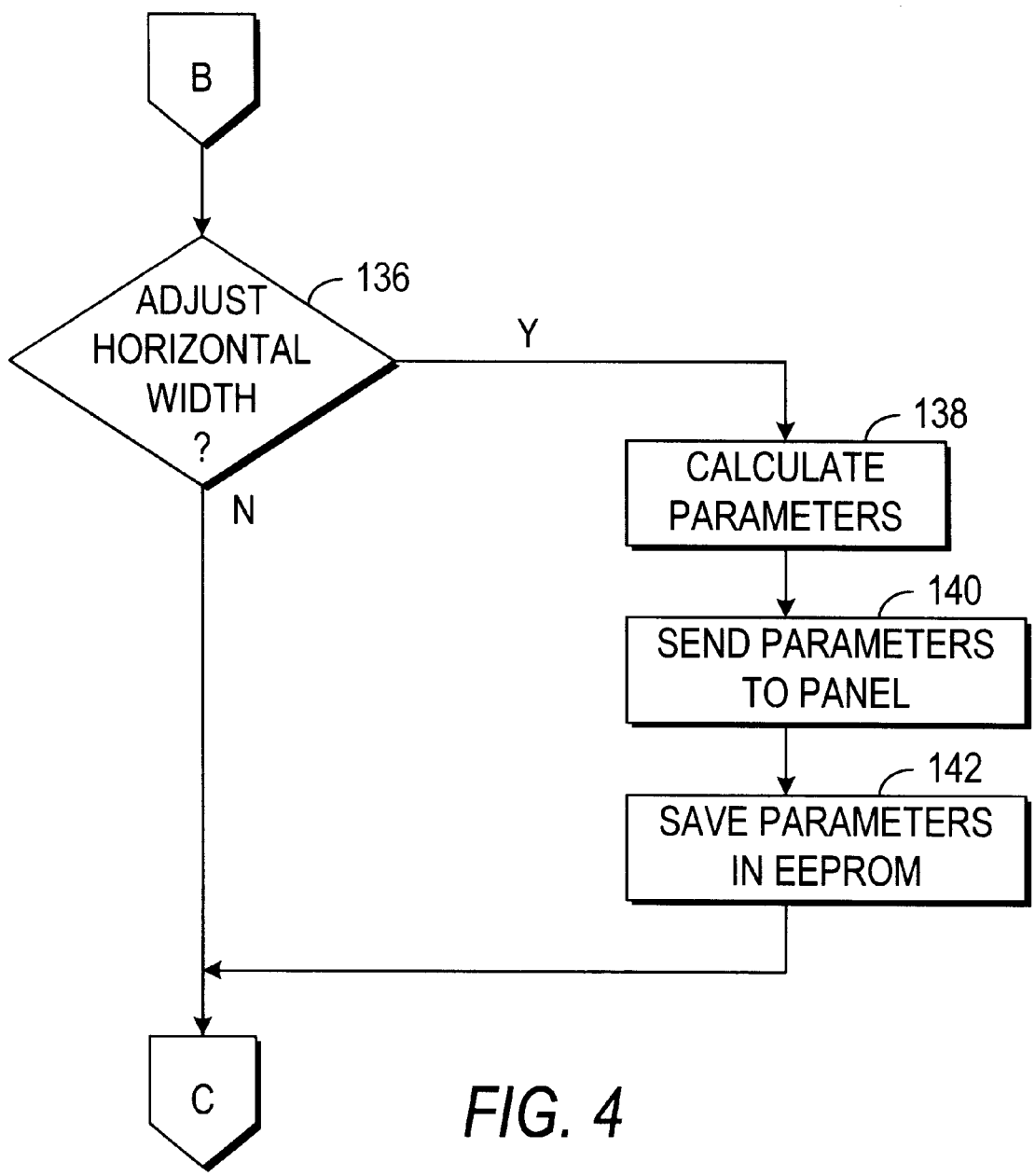
Figure 5:
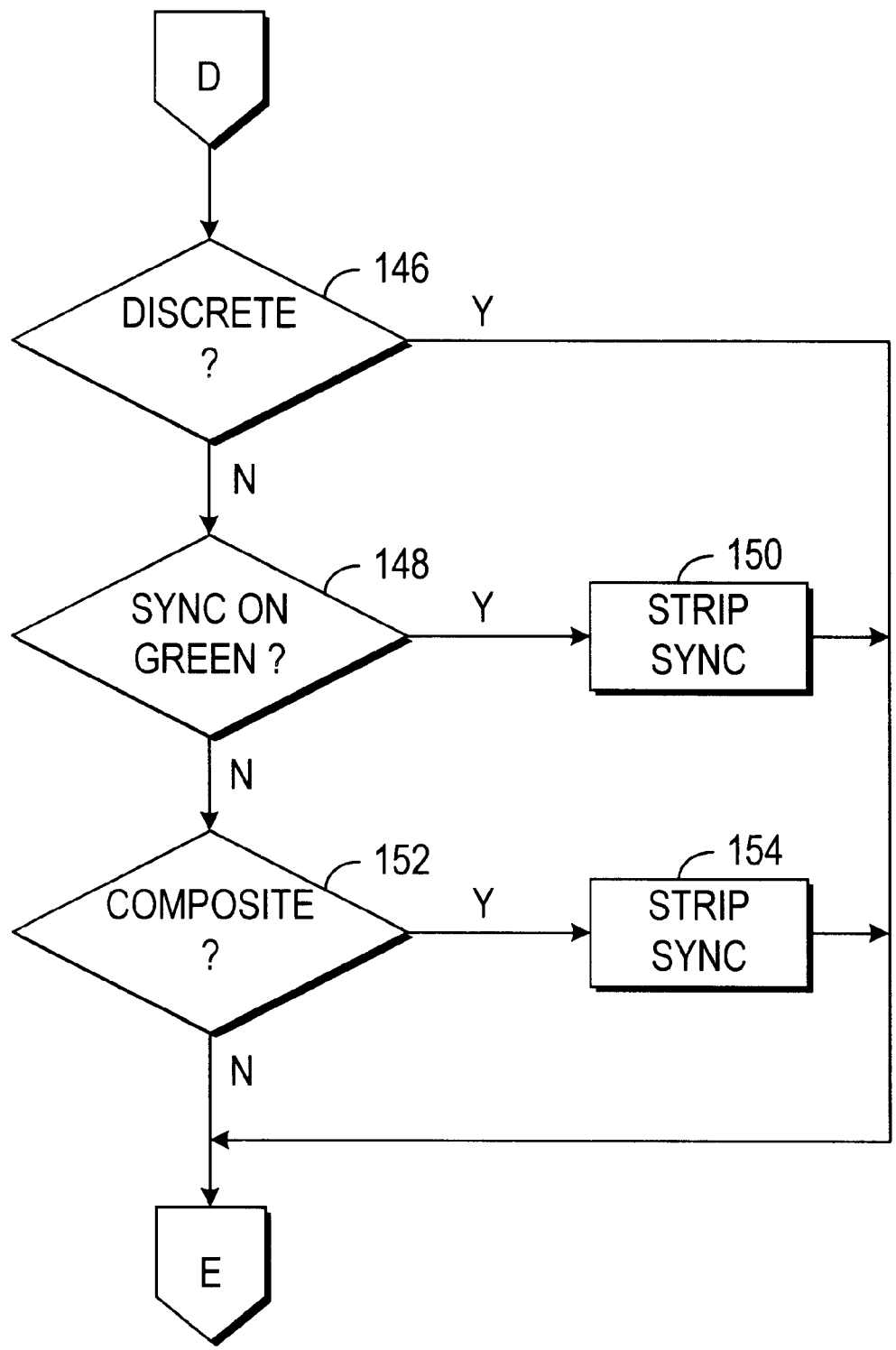
Figure 6:
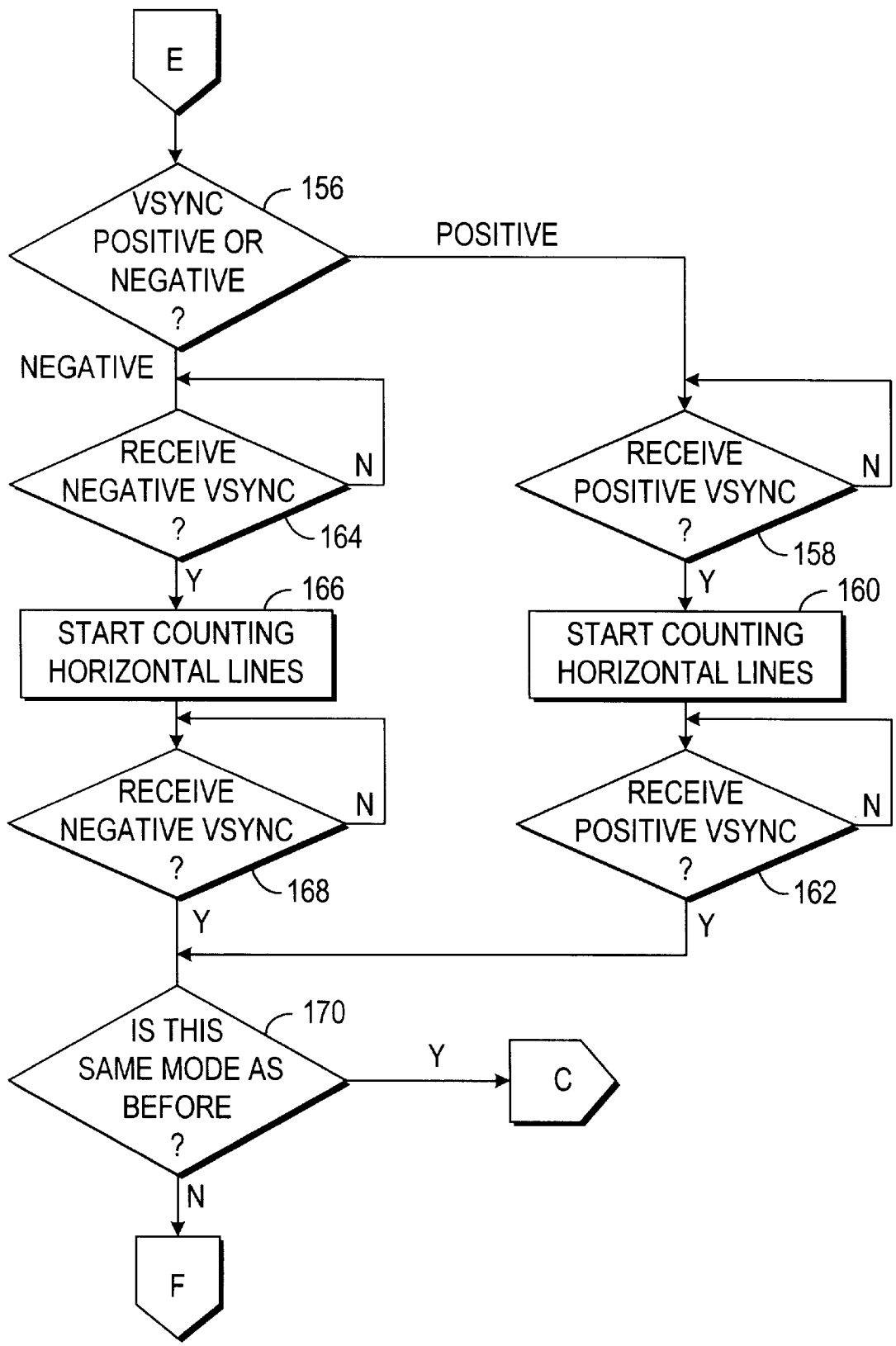
Figure 7:
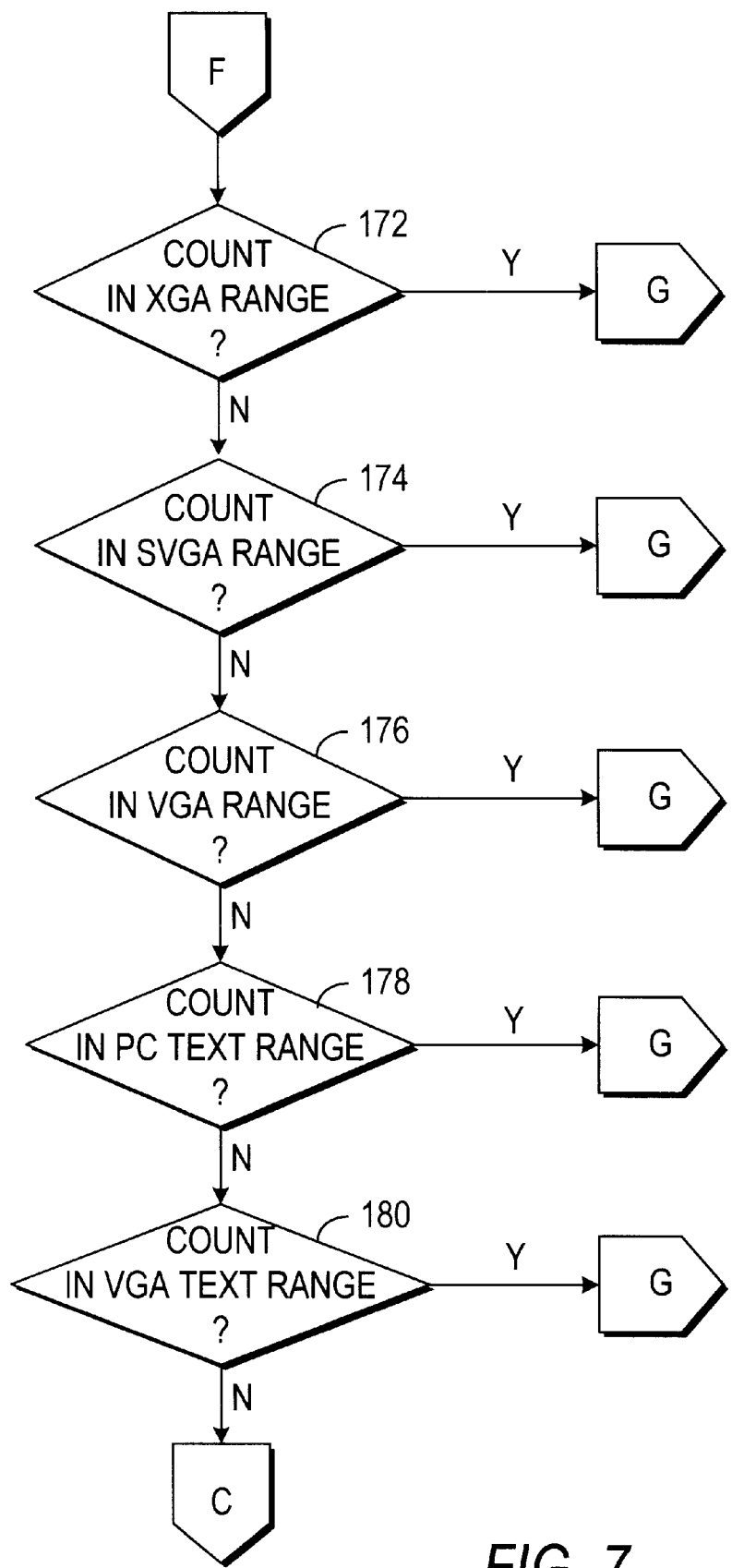
Figure 8:
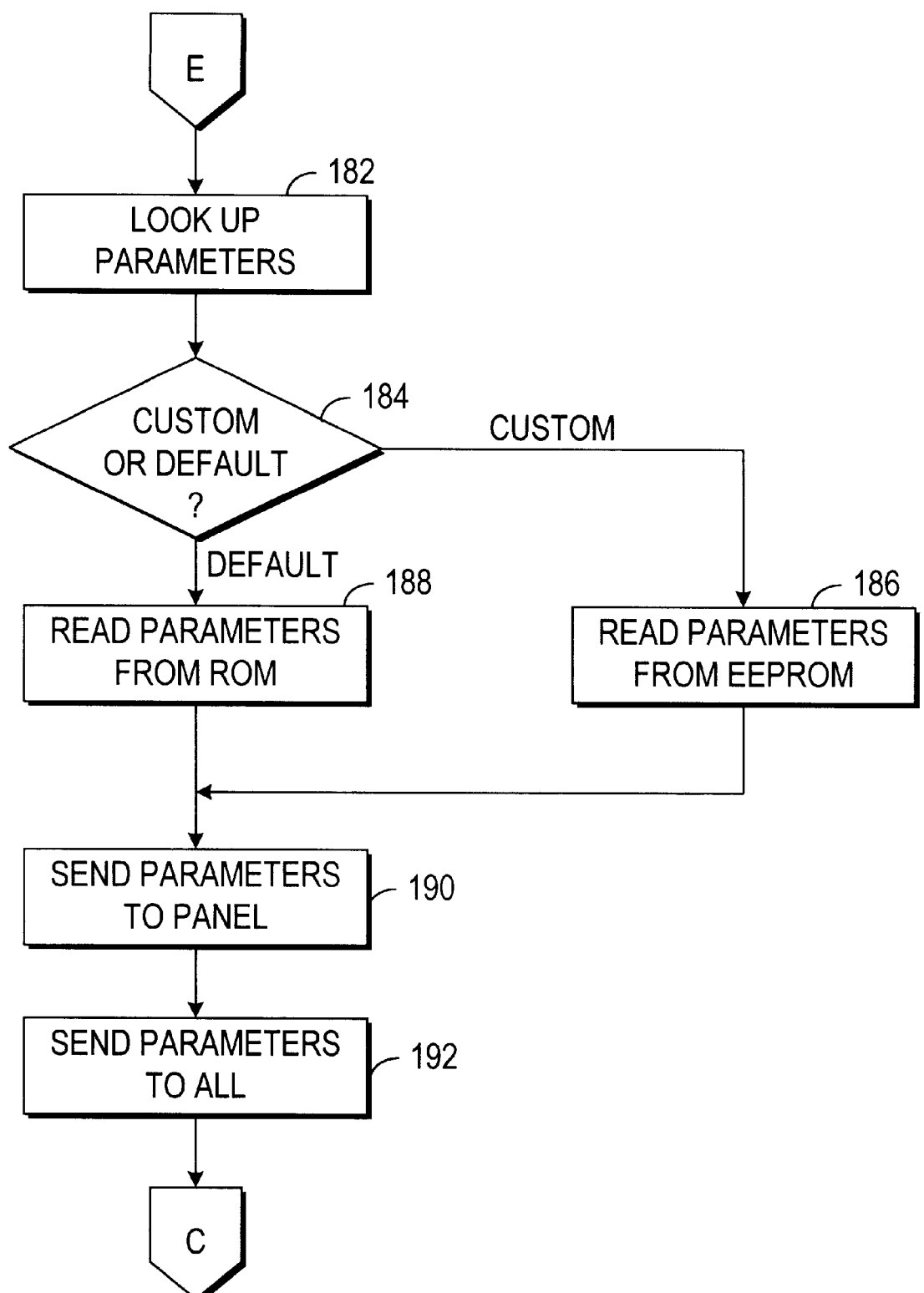

If not, microprocessor 80 in step 118 determines whether the requests for other display adjustments are detected. If microprocessor 80 determines that some adjustments are requested by a user by examining the combination of the depressed buttons in push-buttons 50, microprocessor 80 enters into a maintenance mode which is represented by FIGS. 3 and 4.

Microprocessor 80 determines in step 120 whether horizontal position needs to be adjusted. Such adjustments are made when a user depresses, for example, a right button to move the screen to the right position. If such an adjustment request in horizontal position is detected, microprocessor 80 in step 122 calculates the parameters corresponding to the adjustment request. The parameters are essentially transferred as instruction words. In step 124, microprocessor 80 reissues the calculated parameters to analog LCD panel 30. In step 126, the parameters are formatted into the EEPROM in microprocessor 80 as the default parameters. These adjusted parameters in the EEPROM supersede the standard parameters in the ROM of microprocessor 80.

In step 128, microprocessor 80 determines whether a vertical position needs to be adjusted. If microprocessor 80 detects a request for such adjustment of a vertical position, microprocessor 80 proceeds through steps 128–134 to format the parameters in a similar manner as in steps 120–126.

In step 136, microprocessor 80 determines whether the request for the adjustment of a horizontal width has been detected. If microprocessor 80 determines that the horizontal width needs to be adjusted, microprocessor 80 proceeds through steps 136–142 to format the adjustment width parameters in a similar manner as in steps 120–126. Thereafter, microprocessor 80 terminates a maintenance mode and returns to step 144 of the main loop. In the maintenance mode, any adjustment including even an increment of a single value requires microprocessor 80 to create instruction words that are forty-five bits long to be forwarded to PLL 90 and sixty-six bits long to be forwarded to analog LCD panel 30.

Steps 112–142 are followed only if a user or field service person wants to fine-tune the display values at an initialization stage. The rest of steps 144–184 represent a normal operation in a loop configuration where microprocessor 80 automatically checks the changes in the incoming signals.

In step 144, the main loop begins as microprocessor 80 automatically initializes a timeout timer (not shown). The timeout timer allows constant and periodic reinitiations of the main loop to detect the changes in the incoming signals.

In steps 146–154, microprocessor 80 analyzes the incoming signals and determines the type of encoding of the synchronization signals. More particularly, microprocessor 80 in step 146 determines whether the incoming signals via video cable adaptor 40 are discrete synchronization signals appropriate for immediate use. If microprocessor 80 determines that the horizontal and vertical synchronization signals are in fact provided in a discrete format, such synchronization signals are directly provided to control ASIC 70.

If not, microprocessor 80 in step 148 determines whether the incoming signals are the type of with the synchronization signals on green. If microprocessor 80 determines that the synchronization signals are encoded on the green signal, microprocessor 80 in step 150 passes the green signal to sync-stripper 50. Sync-stripper 50 in step 150 recovers the encoded horizontal and vertical signals from the green signal.

If not, microprocessor 80 in step 152 determines whether the incoming signals are the synchronization on composite type where the synchronization signals are encoded on the composite signal. If the composite signal is used, microprocessor 80 in step 154 passes the composite signal to sync-stripper 50 to recover the encoded horizontal and vertical signals.

In step 156, microprocessor 80 samples the incoming video signals in order to determine the sense of the vertical synchronization signal as either positive or negative. If a positive vertical synchronization signal is received in step 158, microprocessor 80 in step 160 starts counting horizontal lines at the beginning of the frame defined by the positive vertical synchronization signals. Through a mathematical formula, microprocessor 80 does not actually count every single horizontal line but divides the number of horizontal lines by a certain number to obtain better resolution.

In step 162, microprocessor 80 determines whether another positive vertical synchronization signal is detected. If the second positive vertical synchronization signal is detected, microprocessor 80 stops counting the horizontal synchronization lines and sums up the number of the horizontal lines. If not, microprocessor 80 continues counting the horizontal synchronization lines until the receipt of another vertical synchronization signal. The counting is carried out by detecting the number of pulses which correspond to horizontal lines. The number of horizontal lines counted within a frame between the vertical synchronization signals determines the video mode of the video signals presented via video cable adaptor 40. For example, if the number of horizontal lines counted is approximately 480, then the video mode would be 640×480 of VGA.

If the vertical synchronization signal is not positive in step 156, microprocessor 80 determines that the sense of the vertical synchronization is negative. Microprocessor 80 pursues steps 164–168 which are similar to steps 158–162, except for the sense of the synchronization signal. In step 164, microprocessor 80 determines whether a negative synchronization signal is received. If the first negative synchronization signal is received, microprocessor 80 in step 166 starts counting the number of horizontal lines until the second negative vertical synchronization signal is received in step 168.

In step 170, microprocessor 80 determines whether the mode determined through steps 156–168 is the same video protocol as before by comparing the current number that has been just counted and the nominal values of parameters. If there is a match between the nominal values and the current number, microprocessor 80 loops back to step 144.

If not, microprocessor 80 determines in steps 172–180 the display protocol of the incoming signals. In step 172, microprocessor 80 determines whether the number of the counted horizontal lines falls within the XGA range of 1024×768. If the count falls within the XGA range, microprocessor 80 proceeds to retrieve the proper parameters for the XGA display protocol.

If not, microprocessor 80 in step 174 determines whether the counted number falls within the SVGA range of 800×600. If the counted number falls within the SVGA range, microprocessor 80 proceeds to determine the proper parameters for the SVGA display protocol in step 174.

If not, microprocessor 80 in step 176 determines whether the counted number falls within the VGA range of 640×480. If the counted number falls within the VGA range, microprocessor 80 proceeds to determine the proper parameters for the VGA display protocol in step 174.

If not, microprocessor 80 in step 178 determines whether the counted number falls within the PC TEXT range of 720×400. If the counted number falls within the PC Text range, microprocessor 80 proceeds to determine the proper parameters for the PC TEXT display protocol in step 174.

If not, microprocessor 80 in step 180 determines whether the counted number falls within the VGA TEXT range of 640×400. If the counted number falls within the VGA TEXT range, microprocessor 80 proceeds to determine the proper parameters for the VGA TEXT display protocol in step 174.

If not, microprocessor 80 determines that it does not recognize the display protocol or that the counted number goes beyond the capability of the analog LCD panel 30. Microprocessor 80 loops back to step 144 to restart. At the same time, microprocessor 80 goes into a power saving mode where the screen backlights are powered down until it receives incoming signals.

In step 182, microprocessor 80 accesses an index table that contains the parameters for PLL 90 and analog LCD panel 30 based on the display protocol determined in steps 172–180.

In step 184, microprocessor 80 determines whether the looked up parameters are default parameters or customized parameters. For example, the parameters may have previously been adjusted by a user in steps 120, 128 or 136 and the parameters of the display protocol may have been customized with custom parameters. If the parameters are determined to be customized, microprocessor 80 in step 186 reads the parameters from the EEPROM. If the parameters are determined to be default parameters, microprocessor 80 in step 188 reads the default values of the parameters from the ROM. In steps 186 and 188, the frequency parameters closest to the incoming parameters are retrieved.

In step 190, the retrieved parameters are programmed into analog LCD panel 30. In step 192, the parameters are sent to all of the other components in interface 20. For example, the parameters are used to program PLL 90 for the frequency that is suitable for the display resolution. Horizontal position, vertical position, horizontal width and brightness parameters are concurrently updated. Thereafter, microprocessor 80 loops back to step 144. This process, therefore, constantly examines the incoming video signals and adjusts automatically the presented signals for use.

It will be understood that the foregoing is only illustrative of the principles of the invention and that various modifications can be made by those skilled in the art without departing from the scope and spirit of the invention. For example, the numbers of various circuit components can be changed in many different ways to produce interfaces of widely different sizes and complexity.

The invention claimed is:

1. A method for enabling a flat panel display terminal to simulate operations of a multifrequency cathode-ray tube monitor comprising:
   receiving analog video signals;
   extracting synchronization signals from said analog video signals;
   measuring a frequency of said synchronization signals;
   determining a display protocol of said analog video signals based on said frequency;
   retrieving predetermined parameters of said display protocol; and
   programming said flat panel display terminal based on said parameters.

2. The method defined in claim 1, wherein said extracting step comprises the step of recovering horizontal and vertical synchronization signals.

3. The method defined in claim 2 wherein said measuring step comprises the steps of:
   determining a sense of said vertical synchronization signals;
   counting a number of horizontal lines between a first vertical synchronization signal and a second vertical synchronization signal in sequence; and setting said number as said frequency.

4. The method defined in claim 1 wherein the determining step comprises the steps of:
    accessing a database having said predetermined parameters for a plurality of said display protocols; and
    identifying said display protocol with the closest predetermined parameters to said frequency.

5. The method defined in claim 4, further comprising the steps of:
    dividing said frequency by a predetermined number; and
    comparing said divided frequency with said predetermined parameters of said display protocol.

6. The method defined in claim 1, wherein said extracting step comprises the steps of:
    determining a type of synchronization encoding;
    identifying encoded signals based on said type; and
    decoding said encoded signals into said synchronization signals.

7. The method of claim 1 wherein said programming step comprises the steps of:
    programming an analog liquid crystal display panel of said flat panel display terminal with said parameters; and
    programming a phase-locked loop of said flat panel display terminal for a suitable frequency.

8. The method of claim 7 wherein said programming step of said analog liquid crystal display panel comprises the steps of:
    storing horizontal and vertical position parameters;
    storing a horizontal width parameter; and
    storing a brightness parameter.

9. The method defined in claim 1 further comprising the steps of:
    detecting an input from at least one push-button;
    adjusting said parameters based on said input;
    storing said adjusted parameters; and
    reprogramming said flat panel display terminal.

10. A method for enabling a flat panel display terminal to simulate operation of a multifrequency cathode-ray tube monitor comprising the steps of:
    receiving analog video signals;
    extracting color signals and vertical and horizontal synchronization signals from said analog video signals;
    determining a sense of said vertical signals;
    counting a number of said horizontal lines between a frame defined by said vertical signals;
    looking up default parameters for a plurality of display protocols;
    identifying one of said display protocols with the default parameters that are the closest to said counted number;
    retrieving said default parameters for said display protocol;
    programming a liquid crystal display panel of said flat panel display terminal based on said default parameters; and
    programming a phase-locked loop of said flat panel display terminal based on said default parameters.

11. The method defined in claim 10, wherein said extracting step comprises the steps of:
    determining a video mode for encoding said analog video signals; and
    decoding said analog video signals into said vertical and horizontal signals based on said video mode.

12. The method defined in claim 10, further comprising the steps of:
    detecting an input from a plurality of buttons;
    adjusting said parameters including horizontal and vertical positions, a horizontal width and brightness based on said input;
    storing said adjusted parameters; and
    reprogramming an analog liquid crystal display and a phase-locked loop of said flat panel display terminal.

13. The method defined in claim 10, further comprising the step of powering down a backlight of said liquid crystal panel when said video signals are not detected for a predetermined period of time.

14. The method defined in claim 10, further comprising the step of powering down a backlight of said liquid crystal panel when said counted number of said horizontal lines goes beyond a display capability of said liquid crystal display panel.

15. The method defined in claim 10, wherein said display protocols include VGA, SVGA, XGA, TEXT 1 and TEXT 2 protocols.

16. A circuit for enabling a flat panel display terminal to simulate operations of a multifrequency cathode-ray tube monitor comprising:
    circuitry for receiving analog video signals and extracting color signals and synchronization signals from said analog video signals;
    an analog liquid crystal display panel connected to said circuitry;
    a phase-locked loop connected to said circuitry and said analog liquid crystal display panel; and
    a microprocessor connected to said circuitry, said analog liquid crystal display panel and said phase-locked loop for measuring a frequency of said synchronization signals, determining a display protocol of said analog video signals based on said frequency, retrieving predetermined parameters for said display protocol and programming said analog liquid crystal display panel and said phase-locked loop based on said parameters.

17. The circuit defined in claim 16 further comprising a brightness controller connected to said microprocessor and said analog liquid crystal display panel for controlling a brightness of backlights of said liquid crystal display panel.

18. The circuit defined in claim 16 further comprising a sync-stripper for decoding horizontal and vertical synchronization signals from encoded synchronization signals included in said analog video signals.

19. The circuit defined in claim 16 further comprising at least one button for adjusting said parameters.

20. The circuit defined in claim 19 wherein said parameters include horizontal and vertical positions, horizontal width and brightness of said analog liquid crystal display panel.

21. The circuit defined in claim 16 wherein standard parameters for said display protocols are stored as said predetermined parameters in a read-only memory.

22. The circuit defined in claim 21 wherein user-adjusted parameters are stored as said predetermined parameters in an electrically erasable programmable read-only memory, said user-adjusted parameter superseding said standard parameters as said predetermined parameters.

23. The circuit defined in claim 16 further comprising a control application specific integrated circuit for protecting said analog liquid crystal display panel from a power overflow.

24. An apparatus for enabling a flat panel display terminal to simulate operations of a multifrequency cathode-ray tube monitor comprising:

means for receiving analog video signals;

means for extracting color signals and synchronization signals from said analog video signals;

an analog liquid crystal display for receiving said color signals and said synchronization signals;

means connected to said analog liquid crystal display for receiving said synchronization signals and providing clock signals; and means connected to said extracting means for measuring a frequency of said synchronization signals, determining a display protocol of said video signals based on said frequency, retrieving predetermined parameters for said display protocol, and programming said analog liquid crystal display and said clock signal providing means.

* * * * *